3,189,416
EXHAUST GAS COMBUSTION APPARATUS
John Stanley Clarke, Medbourne, near Market Harborough, and Squire Ronald Jackson, Burnley, England, assignors to Joseph Lucas (Industries) Limited, Birmingham, England
Filed Nov. 19, 1962, Ser. No. 238,375
Claims priority, application Great Britain, Nov. 28, 1961, 42,443/61
2 Claims. (Cl. 23—277)

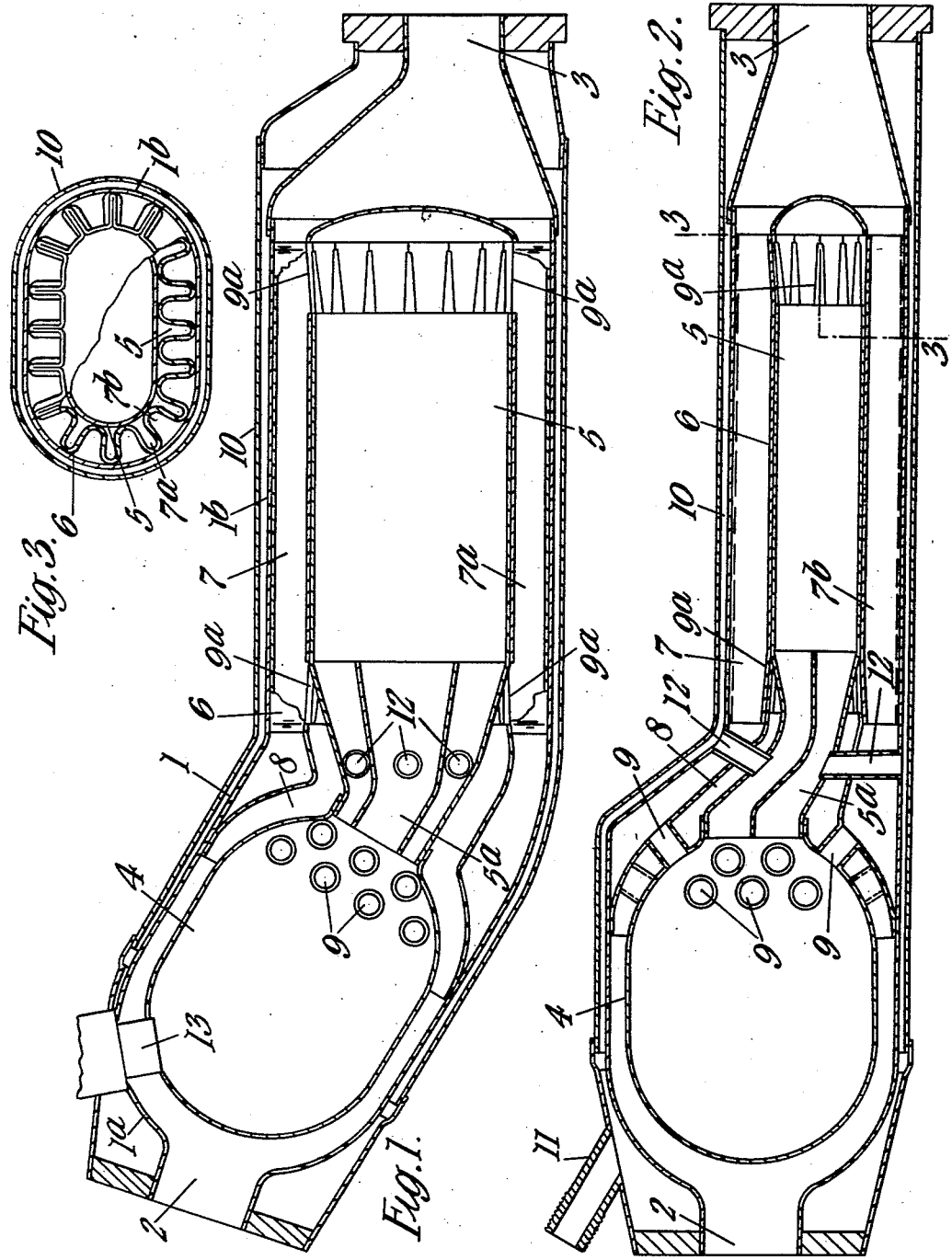

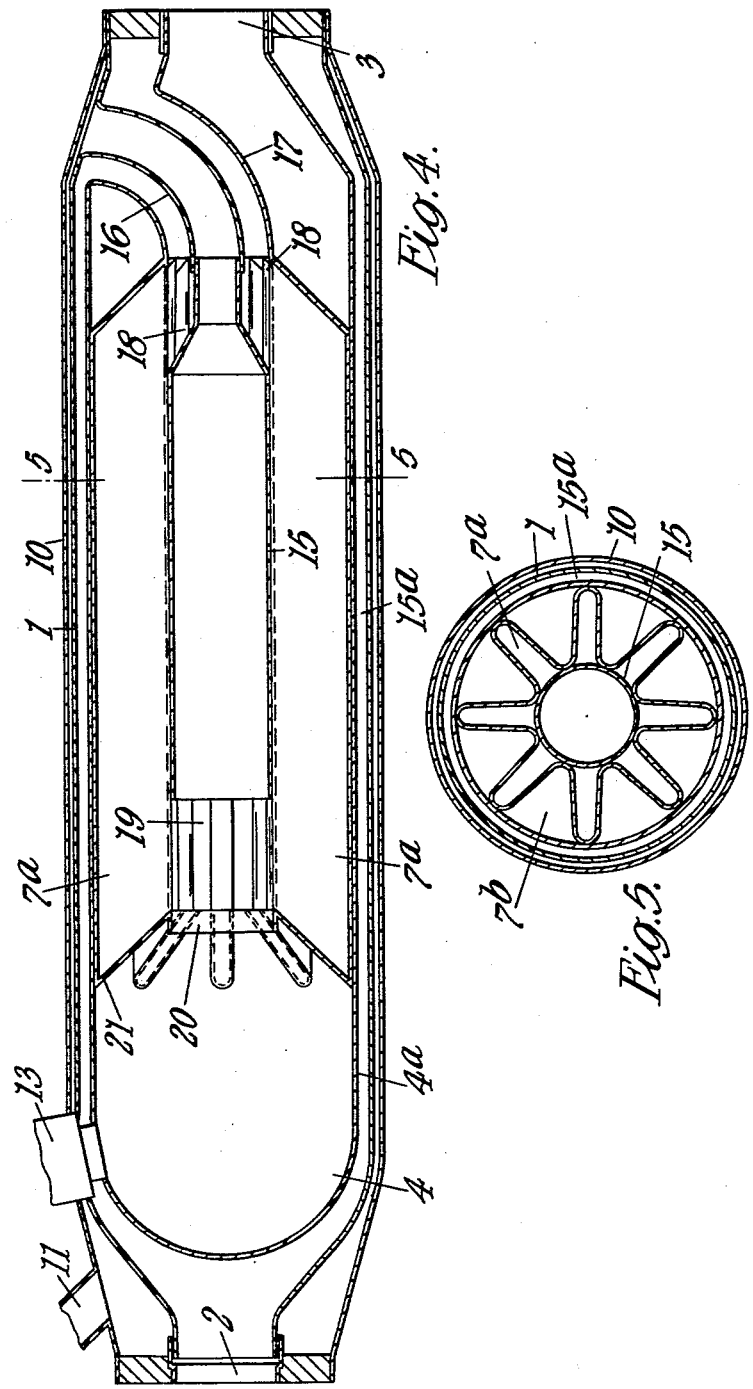

It is well known that internal combustion engines exhaust noxious gases due to incomplete combustion within the engine cylinders, and the object of the present invention is to provide convenient combustion apparatus for incorporation in the exhaust system of an internal combustion engine, and whereby at least a proportion of the noxious gases can be burnt.

Apparatus according to the invention comprises in combination an elongated casing having an exhaust gas inlet at one end, a combustion chamber mounted in spaced relationship within the upstream end portion of the casing, said combustion chamber having a spherical end adjacent the exhaust gas inlet, a tubular part extending downstream from the combustion chamber and in communication therewith, said tubular part defining a mixing zone at its upstream end, an air chest surrounding said casing, a passage through which air from the air chest can be directed to said mixing zone, means in the space between the casing and the tubular part defining two alternating series of longitudinally extending passages of which the one series establishes communication between the exhaust gas inlet and the mixing zone and the other series establishes communication between the combustion chamber, and an outlet at the end of the casing remote from the inlet.

In the accompanying drawings
FIGURE 1 is a sectional plan view of a combustion apparatus in accordance with the invention
FIGURE 2 is a sectional side elevation of the combustion apparatus shown in FIGURE 1
FIGURE 3 is a section on the line 3—3 of FIGURE 2
FIGURE 4 is a plan view of a modified combustion apparatus in accordance with the invention and
FIGURE 5 is a section on the line 5—5 of FIGURE 4.

In an example of the invention there is provided an elongated casing 1 having at one end an inlet 2 which is adapted for connection to the exhaust system (not shown) of an internal combustion engine, and at its other end an outlet 3 to which a tail pipe (not shown) may be connected. The upstream end portion $1^a$ of the casing 1 (i.e. the end portion adjacent the inlet 2) is cylindrical and has its axis inclined to the axis of the downstream end portion $1^b$ which is of flattened form so as to have a cross-section constituted by two semi-circles joined by a pair of parallel sides.

Within the upstream end of the casing a combustion chamber 4 is mounted in spaced relationship. The combustion chamber has spherical ends joined by a short cylindrical part so as to approximate to a sphere, whilst from the centre of the downstream spherical end of the combustion chamber a tubular part 5 extends downstream in spaced relationship to the casing 1 to a position near the outlet where it is closed. The part 5 defines a mixing zone $5^a$ adjacent the downstream end of the combustion chamber. In the space between the tubular part and the casing is a longitudinally corrugated sheet 6 having the crests of its alternate corrugations in contact with the casing and tubular part respectively so as to divide the space into two series of alternating passages $7^a$, $7^b$. The passages of the series $7^a$ are narrower than the passages of the series $7^b$, and are open at their upstream ends to the space 8 between the combustion chamber and the casing, so as to communicate with the exhaust gas inlet 2. However, their downstream ends are closed to the outlet 3, but are in register with holes $9^a$ in the tubular part 5. The passages $7^b$ are open at their downstream ends to the outlet 3, and communicate through a plurality of ports 9 with the combustion chamber at their upstream ends which are closed to the exhaust gas inlet 2.

The casing 1 is surrounded by an air jacket 10 which defines therebetween an air chest. Air can enter this chest through an air inlet 11 at the upstream end, and can flow via a plurality of angularly spaced tubular inlet ports 12 into the combustion chamber.

In use exhaust gases entering the inlet 2, after flowing around the combustion chamber 4, pass by way of the passages $7^a$ to the downstream end of the tubular part 5. The gases then flow upstream through the tubular part and are mixed with air entering via the ports 12 before entering the combustion chamber whence, after combustion, the resulting products are discharged by way of the passages $7^b$ to the outlet 3.

In a modification illustrated in FIGURES 4 and 5 the excess air is delivered from the air jacket to a central pipe 15 via a curved pipe 16 located at the downstream end of the apparatus. Moreover the exhaust gases flow from the inlet 2 via an annular chest $15^a$, formed by the casing 1 and the extended wall $4^a$ of the combustion chamber, to a pipe 17, which surrounds the pipe 16, and which is in communication with the narrower passages $7^a$ via openings 18, formed by the uncovered portion of the passages $7^a$ the downstream ends of the passages $7^a$ are closed in any convenient manner. The air and exhaust gas after flowing upstream through their respective passages are mixed together in a mixing zone 19 and then pass into the combustion chamber via an inlet pipe 20. The inlet pipe 20 is supported on closure members 21 which serve to close the ends of the narrower passage $7^a$. After combustion the spent gases flow via the wider passages $7^b$ to the outlet 3 during which time heat exchange takes place with the fresh exhaust gas. It is envisaged that combustion will be self-sustaining and even self-starting due to the heat exchange between the combustion chamber and the surrounding exhaust gases, and between the gases in alternate passages. However, in order to ensure a quick start to combustion when the engine is started from cold, a sparking plug or other igniter 13 extends into the combustion chamber.

Having thus described our invention what we claim as new and desire to secure by Letters Patent is:

1. Combustion apparatus for treating exhaust gases comprising an elongated casing, an exhaust gas inlet duct at one end of the casing, an outlet duct at the opposite end of the casing, an inner casing defining a combustion chamber of generally spherical form, said inner casing being mounted within an upstream end portion of the casing, a tubular part extending from the inner casing towards the opposite end of the casing, a portion of the tubular part adjacent to the inner casing comprising a mixing section, an outer air chest surrounding said casing, a duct connecting the air chest with said mixing section, passage forming means in a space defined between the casing and the tubular part, defining two alternating series of side-by-side longitudinally extending passages, one of said series forming passages connecting the exhaust gas inlet duct and the mixing section, and the other of said series forming passages connecting the combustion chamber and the outlet duct.

2. Combustion apparatus according to claim 1 in which the passage forming means comprises a longitudinally corrugated sheet, alternate crests of said sheet being secured at angularly spaced positions to said tubular part and to the casing respectively.

References Cited by the Examiner
UNITED STATES PATENTS

| | | | |
|---|---|---|---|
| 1,848,990 | 3/32 | Boyd et al. | 23—277 |
| 2,396,190 | 3/46 | Morgan et al. | 23—288.3 |
| 2,985,255 | 5/61 | Clark | 23—277 C |

MORRIS O. WOLK, *Primary Examiner.*

DELBERT E. GANTZ, *Examiner.*